(12) United States Patent
Eide

(10) Patent No.: US 6,823,305 B2
(45) Date of Patent: Nov. 23, 2004

(54) APPARATUS AND METHOD FOR SPEAKER NORMALIZATION BASED ON BIOMETRICS

(75) Inventor: Ellen M. Eide, Mount Kisco, NY (US)

(73) Assignee: International Business Machines Corporation, Armonk, NY (US)

( * ) Notice: Subject to any disclaimer, the term of this patent is extended or adjusted under 35 U.S.C. 154(b) by 862 days.

(21) Appl. No.: 09/745,115

(22) Filed: Dec. 21, 2000

(65) Prior Publication Data

US 2002/0082830 A1 Jun. 27, 2002

(51) Int. Cl.⁷ .............................................. G10L 15/06
(52) U.S. Cl. ..................................... 704/234; 704/237
(58) Field of Search ................................ 704/234, 237, 704/246, 270, 273

(56) References Cited

U.S. PATENT DOCUMENTS

| | | | | |
|---|---|---|---|---|
| 5,121,434 A | * | 6/1992 | Mrayati et al. | 704/261 |
| 5,696,878 A | * | 12/1997 | Ono et al. | 704/250 |
| 6,236,963 B1 | * | 5/2001 | Naito et al. | 704/241 |
| 6,298,323 B1 | * | 10/2001 | Kaemmerer | 704/246 |
| 6,356,868 B1 | * | 3/2002 | Yuschik et al. | 704/246 |

OTHER PUBLICATIONS

Lawrence W. Rabiner and Ronald W. Schafer, *Digital Processing of Speech Signals* published by Prentice Hall, Inc., Englewood Cliffs, NJ 07632 in 1978, pp. 62–65.

"A Parametric Approach to Vocal Tract Length Normalization" by Ellen Eide and Herbert Gish as published by the IEEE in the Proceedings of the ICASSP of 1996, at pp. 346–348.

"Speaker Normalization Using Efficient Frequency Warping Procedures" Li Lee and Richard C. Rose, as published by the IEEE in the Proceedings of the ICASSP of 1996, at pp. 353–356.

"Speaker Normalization on Conversational Telephone Speech" by Steven Wegmann et al., as published by the IEEE in the Proceedings of the ICASSP of 1996, at pp. 339–341.

* cited by examiner

*Primary Examiner*—Richemond Dorvil
*Assistant Examiner*—Abul K. Azad
(74) *Attorney, Agent, or Firm*—Thu A Dang

(57) ABSTRACT

Speaker normalization is carried out based on biometric information available about a speaker, such as his height, or a dimension of a bodily member or article of clothing. The chosen biometric parameter correlates with the vocal tract length. Speech can be normalized based on the biometric parameter, which thus indirectly normalizes the speech based on the vocal tract length of the speaker. The inventive normalization can be used in model formation, or in actual speech recognition usage, or both. Substantial improvements in accuracy have been noted at little cost. The preferred biometric parameter is height, and the preferred form of scaling is linear scaling with the scale factor proportional to the height of the speaker.

41 Claims, 3 Drawing Sheets

APPARATUS AND METHOD FOR SPEAKER NORMALIZATION BASED ON BIOMETRICS

BACKGROUND OF THE INVENTION

1. Field of the Invention

The present invention relates to speech recognition, and more particularly relates to an apparatus and method for speaker normalization based on biometrics.

2. Brief Description of the Prior Art

It has been well established in the field of automatic speech recognition that normalizing waveforms to account for the vocal tract differences among speakers yields more accurate results than can be obtained in systems which do not include such normalization. If an open vocal tract model is assumed, such as would be appropriate for an open vowel (for example/UH/), a uniform tube model provides a good approximation to the vocal tract, as discussed by Lawrence W. Rabiner and Ronald W. Schafer in the text *Digital Processing of Speech Signals* published by Prentice-Hall, Inc., Englewood Cliffs, N.J. 07632 in 1978.

In the uniform tube model, when one scales the tube by a factor 1/k, this results in a scaling of all of the resonances of the tube by k and, therefore, a linear scaling of the frequency axis is appropriate. In practice, linear scaling has been shown to be effective in normalizing for differences in vocal tract length. In implementation, once a form of frequency scaling (for example, linear scaling, f*=kf) has been chosen, the remaining question is how to determine a scale factor $k_i$ for each speaker i.

It has been known in the prior art to derive an estimated scale factor based on formant positions, as set forth in the paper "A Parametric Approach to Vocal Tract Length Normalization" by Ellen Eide and Herbert Gish as published by the IEEE in the Proceedings of the ICASSP of 1996, at pages 346–48.

Other results have been published for general speech corpora based on exhaustive search, for example, refer to "Speaker Normalization Using Efficient Frequency Warping Procedures" by Li Lee and Richard C. Rose, as published at pages 353–56 of the aforementioned 1996 ICASSP Proceedings, and "Speaker Normalization on Conversational Telephone Speech" by Steven Wegmann et al., as published at pages 339–41 of the aforementioned proceedings.

One case of interest is the situation where a database is available which contains biometric information in the form of a biometric parameter (such as speaker height) which would permit the normalization factor for each speaker to be computed by taking the ratio of the value of the speaker's biometric parameters to some measure of an average value of the biometric parameter, such as the average across all speakers in the training database.

In view of the foregoing, there is a need in the prior art for a speaker normalization apparatus and method which are based on biometrics pertaining to the speaker.

SUMMARY OF THE INVENTION

The present invention, which addresses the needs identified in the prior art, provides a method of speaker normalization. The method includes the steps of receiving a first biometric parameter, calculating a first frequency scaling factor based on the first biometric parameter, and extracting acoustic features from speech of a user in accordance with the first frequency scaling factor. The first biometric parameter is correlated to vocal tract length of a given user of a speech recognition system.

The present invention further provides an apparatus for speaker normalization, which includes a biometric parameter module, a calculation module, and an acoustic feature extractor. The biometric parameter module receives the first biometric parameter which is correlated to the vocal tract length of the user. The calculation module calculates the first frequency scaling factor based on the first biometric parameter. The acoustic feature extractor extracts acoustic features from speech of the user in accordance with the first frequency scaling factor.

The present invention can be implemented in hardware, software, or a combination of hardware and software, and accordingly also encompasses a program storage device readable by machine, tangibly embodying a program of instructions executable by the machine to perform method steps for speaker normalization as set forth herein.

Accordingly, it will be appreciated that the method and apparatus of the present invention provide an improvement over prior-art approaches, inasmuch as an appropriate scaling factor can be readily determined, so as to improve the accuracy of an associated speech recognition system, based on biometric data pertaining to users of the system, which may be, for example, pre-stored, or which may be ascertained during an interaction with the speaker.

These and other features and advantages of the present invention will be appreciated by reading the following specification, taking in conjunction with the accompanying drawings, and the scope of the invention will be set forth in the appended claims.

DETAILED DESCRIPTION OF THE INVENTION

Figure 1:
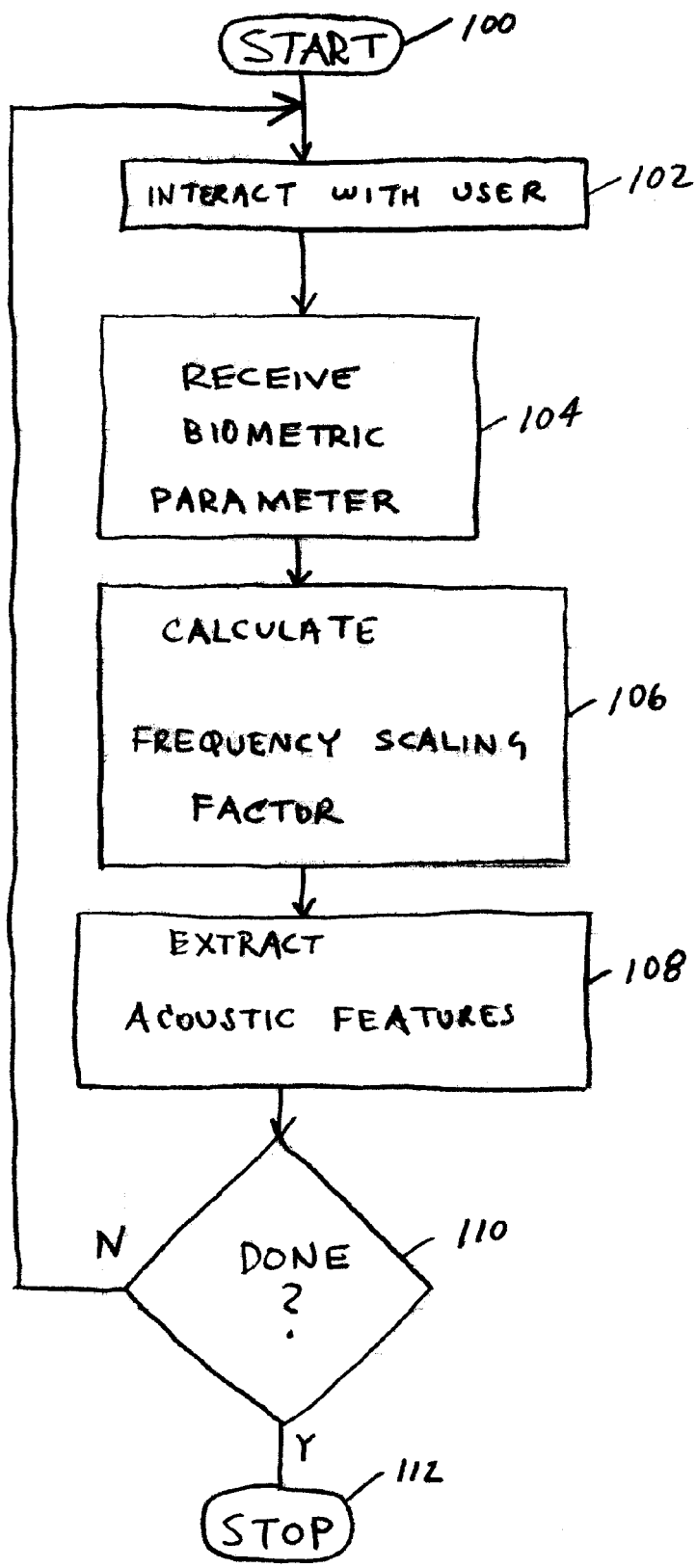
FIG. 1 is a flow chart illustrating one form of a method for speaker normalization based on biometrics in accordance with the present invention.

Reference should now be had to the flow chart of FIG. 1. A method of speaker normalization, in accordance with the present invention, includes the step of receiving a first biometric parameter, as suggested at block 104. The first biometric parameter can be designated as $\gamma_i$. The first biometric parameter can be correlated to the vocal tract length of an $i^{th}$ user of a speech recognition system. As suggested at block 106, a first frequency scaling factor, which may be designated $k_i$, can be calculated based on the first biometric parameter. Further, as suggested at block 108, acoustic features can be extracted from the speech of the $i^{th}$ user in accordance with the first frequency scaling factor.

The first biometric parameter can be, for example, height, a spatial dimension of a preselected bodily member (such as an arm or a leg), or the size of an article of clothing which correlates with the spatial dimension. For example, the spatial dimension can include length, width, girth and the like, and the size could be sleeve length, inseam, shoe size and the like. At present, it is believed that height is the preferred biometric parameter to employ, but is to be emphasized that all other suitable biometric parameters are within the scope of the present invention.

In one aspect of the invention, after starting the process, as suggested by block 100, interaction with the user can be carried out in accordance with block 102. In certain embodiments of the invention, the interaction with the user could include querying the user for a value indicative of the first biometric parameter. In this case, the step of receiving the first biometric parameter could include receiving the parameter from the user in response to the querying. The value indicative of the first biometric parameter should be broadly understood to include an actual value of the parameter, such as height, or a numerical size of an article of clothing, but could also include a more approximate estimate of the user's measurements, such as "tall," "average" or "short"; "small," "medium" or "large"; and the like.

In other aspects of the invention, the first biometric parameter can be sensed by automated observation of the user; by way of example, the user's height could be determined by a system of electric eyes or other sensors.

In addition to the aforementioned interaction with the user in the form of querying the user or automatically sensing the biometric parameter, other forms of interaction with the user can be carried out. For example, the user can be identified in any appropriate fashion and the step of receiving the first biometric parameter can be carried out by extracting the first biometric parameter from a database of users based on the identify of the user. The identification can be preformed in any suitable manner, for example, by determining the user's name, identification number, etc. In one embodiment of the invention, the identification can be performed using speaker identification, through any of a number of speaker identification routines which are well known in the art.

The step of extracting the acoustic features is preferably carried out by frequency axis frequency scaling in accordance with the first frequency scaling factor $k_i$. Although all forms of frequency scaling are contemplated as being within the scope of the present invention, it is presently believed that the preferred form of frequency scaling is linear frequency scaling, in accordance with the equation:

$$f^* = k_i f \quad (1)$$

wherein:
f* is a scaled frequency, and
f is an original frequency.

The first frequency scaling factor can advantageously be determined in accordance with the equation:

$$k_i = \gamma_i / \gamma_{av} \quad (2)$$

wherein $\gamma_{av}$ is an average value of the first biometric parameter for a representative population of users. For example, it could be the average height over a representative population of users.

Thus, it will be appreciated that the first barometric parameter $\gamma_i$, can be the height, $h_i$, of the user, and that the first frequency scaling factor, in this case, can be determined in accordance with $$k_i = h_i / h_{av}, \quad (3)$$

where $h_{av}$ is an average height for the representative population of the users. The frequency scaling is preferably achieved by digital signal processing of a signal representative of the speech of the user; however, other suitable techniques of frequency scaling are contemplated as being within the scope of the present invention.

In one application of the present invention, the user can be a training speaker, and the step of extracting the acoustic features can further include the sub-step of formatting the acoustic features for subsequent acoustic model building. Construction of acoustic models is well known in the art.

In another aspect of the present invention, the user can be a "testing" speaker, or an actual user of a system, in which case the step of extracting the acoustic features can include the sub-step of formatting the acoustic features for subsequent speech recognition. Thus, it will be appreciated that the "stop" block 112 in FIG. 1 merely represents the optional end of the normalization process, but the extracted acoustic features can be utilized for model building, speech recognition, or any other desired purpose following the normalization.

Figure 2:
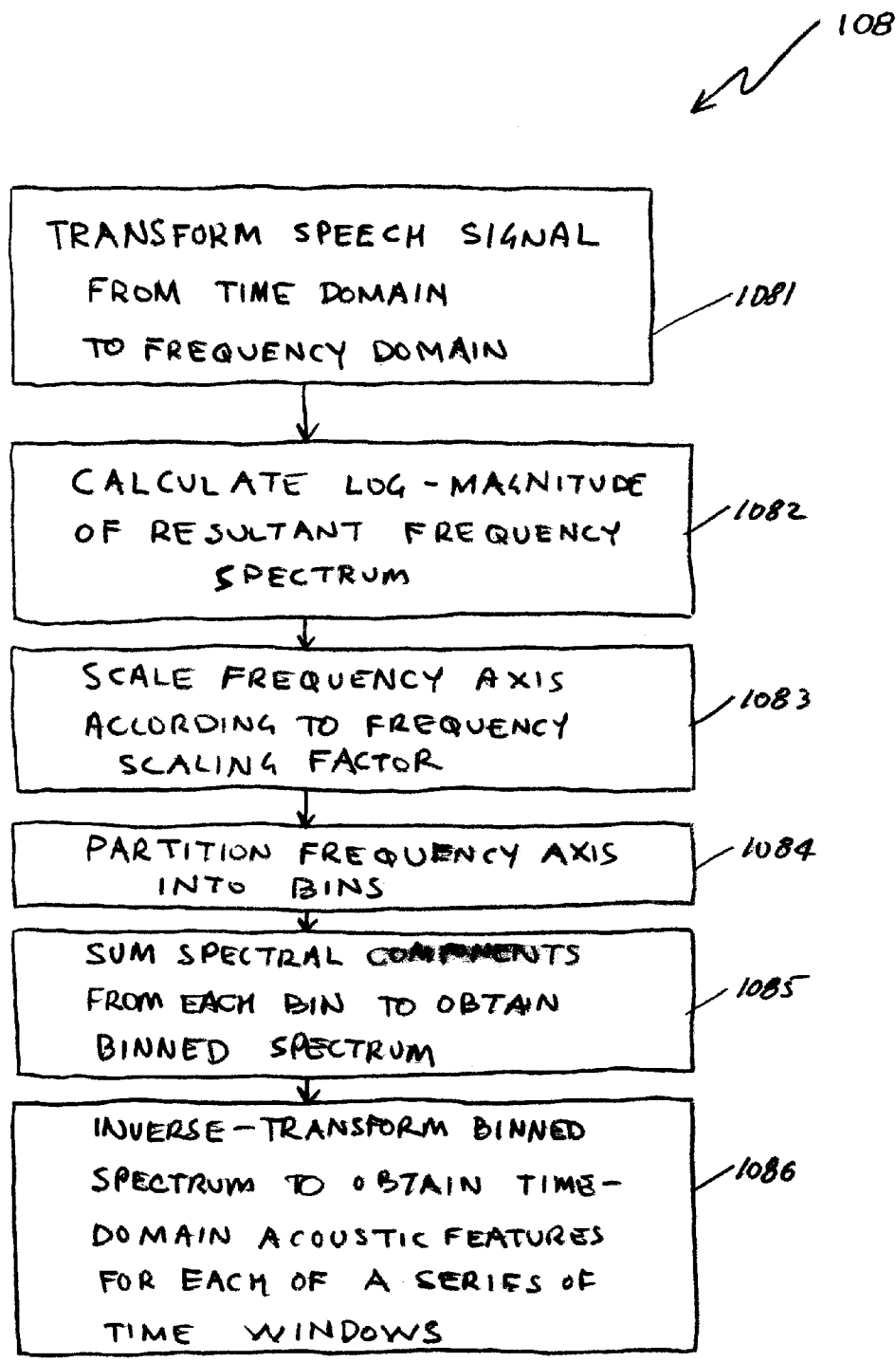
FIG. 2 is a flow chart showing one method in which acoustic features may be extracted in accordance with the present invention.

Attention should now be given to FIG. 2, which presents a flow chart illustrating one optional manner in which the extraction of acoustic features can be accomplished in block 108. For convenience, sub-steps depicted in FIG. 2 have received a four digit reference character commencing with the digits 108 and having digits 1–6 appended thereto, that is, numbers 1081–1086 are employed. As shown at block 1081, a signal representative of the speech of the user can be transformed from a time domain to a frequency domain, in order to obtain a resulting frequency spectrum having a frequency axis. Any suitable type of transform can be employed, but at present, a fast Fourier transform (FFT) is believed to be preferable. In block 1082, the log-magnitude of the resultant frequency spectrum can be calculated. Then, in block 1083, the frequency axis can be scaled according to the first frequency scaling factor $k_i$.

In block 1084, the frequency axis can be partitioned into bins, while in block 1085 the spectral components falling into each of the bins can be summed so as to obtain a binned spectrum. Then, in block 1086, the binned spectrum can be inverse-transformed to obtain time-domain acoustic features for each of a series of time windows.

The scaling sub-step can include any suitable form of scaling, but preferably includes linear scaling in accordance with equation 1 above.

Reference should now again be had to FIG. 1. As suggested at block 110, the speaker normalization process can be repeated as needed for other users of the speech recognition system. Thus, for example, a second biometric parameter, designated as $\zeta_j$, which is correlated to the vocal tract length of a $j^{th}$ user of the speech recognition system, can be received. Further, a second frequency scaling factor $k_j$ can be calculated based on the second biometric parameter, and acoustic features from the speech of the $j^{th}$ user can be extracted in accordance with the second frequency scaling factor.

In such case, before any of the biometric parameters are received at block 104, interaction can be carried out with the user in accordance with block 102, such that the $i^{th}$ user can be queried regarding which of N biometric parameters the $i^{th}$ user wishes to employ as the first biometric parameter, while the $j^{th}$ user can be queried regarding which of the N biometric parameters the $j^{th}$ user wishes is to employ as the second biometric parameter. It should be appreciated that such interaction would be carried out when N is greater than or equal to 2. It should further be understood that the first and second biometric parameters could be the same biometric parameter, or different users could employ different biometric parameters such that the first and second biometric parameters were different biometric parameters.

In view of the foregoing, it will be appreciated that, in a method in according to the present invention, scaling of the frequency axis for each speaker can preferably be performed in accordance with Equation 1 so as to account for the vocal tract length of the $i^{th}$ speaker. The present invention seeks to estimate the scaling factor $k_i$ for the $i^{th}$ speaker. Such scaling factor is preferably determined in accordance with Equation 2, and most preferably is determined in accordance with Equation 3, where, as noted, $h_{av}$ can be taken as the average height across speakers in the training database. The normalization computation permits enhanced accuracy in a speech recognition system with very little cost.

As noted, while speaker height is the preferred biometric parameter, any biometric data which is correlated with the vocal tract length can be employed. Further, and again as noted, the normalization can be performed using any appropriate scaling function of the frequency axis, not merely the linear function of the preferred embodiment.

As discussed above, scaling can be employed on training speakers, on testing speakers (i.e., system users), or on both. If the normalization is performed during both training and test (i.e. use), any appropriate value can be used for $\gamma_{av}$ or $h_{av}$. However, when the normalization is done only during test, i.e. use, the value of $\gamma_{av}$ should be the average value of the appropriate biometric parameter for the representative population of users, and the value $h_{av}$ should be an estimate of the average speaker height.

It will be appreciated by those of skill in the art that the method and apparatus of the present invention are intended for use with speaker-independent speech recognition. When the normalization method and apparatus of the present invention are used during training, the speakers who are donating the data can be asked to provide appropriate biometric data. The frequency axis for each of the donating speakers can then be scaled according to the corresponding biometric parameter, and the acoustic model can subsequently be built. The resultant model can be used in testing (i.e. actual use), both in the case where scaling is employed on the actual user, and the case where it is not. In experiments, it has been found that the effects are substantially additive. That is to say, normalizing the training speakers but not the test (use) speakers gives a gain which can be designated as G. Normalizing the test (use) speakers but not the training speakers gives a gain which can be designated as K. Normalizing both groups of speakers gives a gain in recognition accuracy which is close to the value of G+K. In testing the present invention, a value of $h_{av}$=68 inches was employed, as this is the average height of American adults.

It will be appreciated that in an ordinary speech recognition system, without normalization, acoustic features are simply extracted from the user's speech and are subsequently decoded to determine a word hypothesis. In the present invention, an appropriate biometric parameter is determined for the user, a scale factor is calculated, and feature extraction occurs including frequency scaling based on the calculated scale factor, all as previously discussed and illustrated with respect to FIG. 1.

Referring again to FIG. 2, it will be appreciated that, except for the step of scaling the frequency axis in block 1083, the depicted sub-steps are similar to those used for feature extraction without frequency scaling.

As noted, the transformation of the speech signal from the time domain to the frequency domain is preferably carried out by computing fast Fourier transforms. In such case, block 1086 would involve the computation of appropriate inverse fast Fourier transforms. It should be appreciated that decoding of the acoustic features produced by the present invention can proceed just as in a system where no normalization is performed, however, the features which are employed are those which result from the above-described scaling of the frequency axis.

Figure 3:
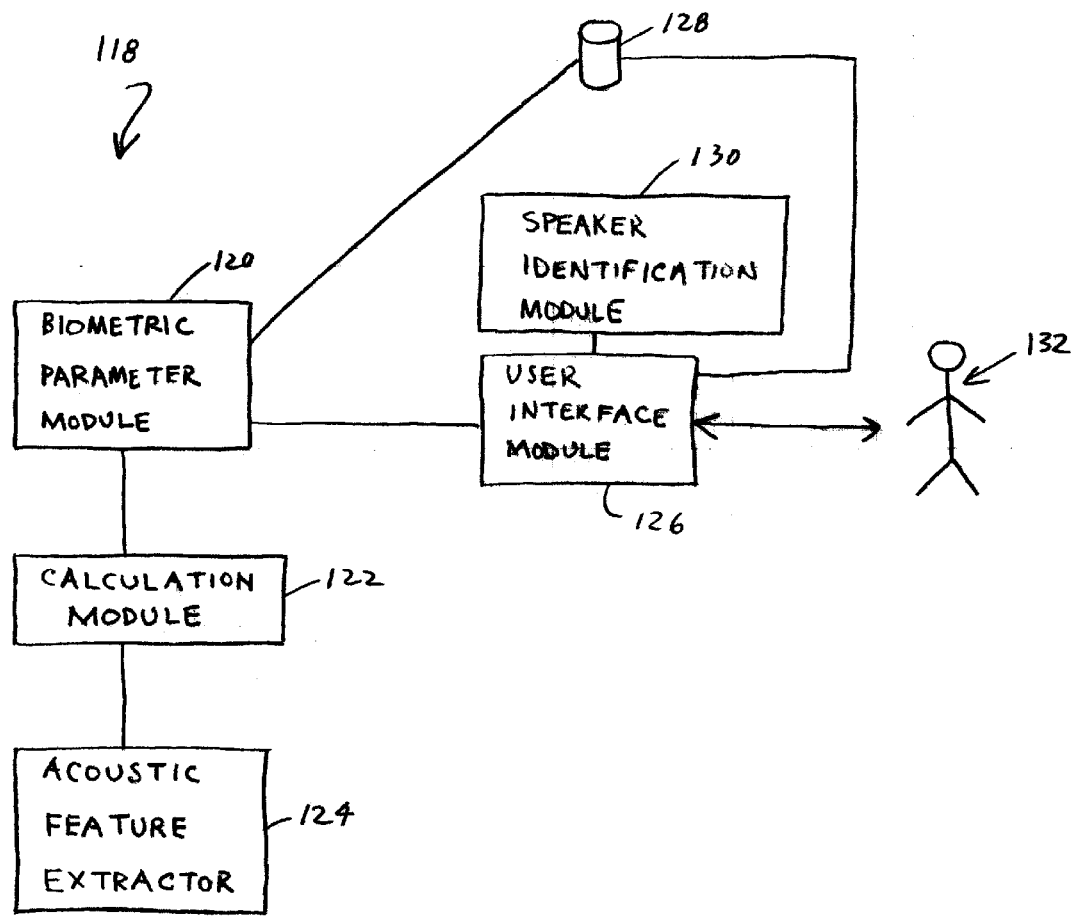
FIG. 3 is a schematic diagram of an apparatus for speaker normalization based on biometrics in accordance with the present invention.

Attention should now be given to FIG. 3 which depicts an apparatus for speaker normalization in accordance with the present invention. The apparatus is designated generally as 118. The apparatus includes a biometric parameter module 120 which receives the first biometric parameter, $\gamma_i$, as discussed above. The apparatus further includes a calculation module 122 which calculates the first frequency scaling factor, $k_i$, as discussed above. Further, the apparatus includes an acoustic feature extractor 124 which extracts acoustic features from speech of the $i^{th}$ user in accordance with the first frequency scaling factor. As set forth above, height is the preferred choice for the first biometric parameter, but any of the other parameters discussed above can be employed.

In some embodiments of apparatus 118, a user interface module 126 can be provided in order to interface with a user 132. For example, the user interface module 126 could query the user 132 for a value indicative of the first biometric parameter, such that the biometric parameter module 120 could receive the first biometric parameter from the user 132, via the user interface module 126, in response to the querying.

In another aspect of the invention, user interface module 126 could sense the first biometric parameter by automated observation of the user, as discussed above with respect to the method of the present invention.

In other aspects of the present invention, the apparatus 118 can optionally include a database of users 128 which contains biometric parameters of given users stored with identities of the given users. "Identities" in this context should be broadly understood to refer to any appropriate data which permits the matching of the stored biometric parameters with the users. In the case when database 128 is employed, the user interface module 126 can be configured to perform identification on the user 132 so as to determine the identity of the user 132, and the user interface module 126 can provide appropriate control to extract the first biometric parameter from the database of users 128 based on the identity of the user 132.

In still another aspect of the invention, the apparatus 118 can optionally include a speaker identification module 130 which is coupled to the user interface module 126. The interface module 126 can communicate with the speaker identification module 130 so as to perform identification of the user 132 via speaker identification. As noted above, any number of well-known routines are available for speaker identification.

The acoustic feature extractor 124 can perform frequency axis frequency scaling in accordance with the first frequency scaling factor. Such scaling preferably includes linear frequency scaling in accordance with Equation 1 above. The first frequency scaling factor can be determined in accordance with Equation 2 above, and preferably in accordance with Equation 3 above. The feature extractor 124 can preferably perform the frequency scaling via digital signal processing of a signal representative of the speech of the user.

The apparatus 118 can be employed for both training speakers and testing speakers (i.e., actual users). When employed with training speakers, the acoustic feature extractor 124 can format the acoustic features for subsequent acoustic model building, as discussed above. When the user 132 is a testing speaker (i.e., actual user of a speech recognition system), the acoustic feature extractor 124 can format the acoustic features for subsequent speech recognition, as discussed above.

The acoustic feature extractor 124 can be appropriately configured to perform the method steps depicted in FIG. 2 and discussed above.

It will be appreciated that the biometric parameter module 120 can be configured to receive a second biometric parameter, $\zeta_j$, correlated to vocal tract length of a $j^{th}$ user of the speech recognition system, while the calculation module 122 can be configured to calculate a second frequency scaling factor, $k_j$, based on the second biometric parameter. Further, the acoustic feature extractor 124 can be configured to extract acoustic features from speech of the $j^{th}$ user in accordance with the second frequency scaling factor. In this case, the user interface module 126 can be configured to query the $i^{th}$ and $j^{th}$ users, as discussed above with regard to the method, as to which of N biometric parameters each wishes to employ as the corresponding biometric parameter. Again, the first and second biometric parameters can be the same biometric parameter or can be different biometric parameters.

The methods of the present invention can be carried out using any suitable apparatus, and the apparatus of the present invention can be implemented in any of a number of ways. At present, it is believed preferable that the present invention should be implemented in software by programing a suitable general purpose computer, such as a personal computer, an enterprise server, or the like. In one preferred embodiment of the invention, the modules 120, 122, 130 can be implemented as software programs, as can the acoustic feature extractor 124. The user interface module 126 can be implemented as an appropriate software program which interfaces with appropriate hardware devices in order to communicate with user 132. For example, module 126 could interface with a microphone and speaker, a keyboard, a mouse, a display, a track ball, a joy stick, or any other suitable device. Further, user interface module 126 could interface with appropriate sensors, such as electric eyes (e.g., a plurality of photodiode and beam arrangements) or the like designed to sense the height of user 132, or sensors designed to sense any other detectable biometric parameter. The database 128 can reside on a suitable mass storage device such as a hard disk, floppy disk, CD-ROM, tape or the like, and can be loaded into RAM as desired. Any suitable form of computer storage can be employed. In addition to the preferred implementation on a digital computer, as appropriate, portions of the apparatus can be implemented using analog computation devices, or employing various types of hardware, such as, for example, application specific integrated circuits (ASICs), circuits formed using discrete components, or hybrid circuits. In the preferred digital computer-implemented embodiment, any appropriate type of processor can be employed. As noted, this could be an enterprise server or personal computer. Further, any other type of processor-based system could be employed, and still further, processing could be carried out in a distributed fashion by more than one processor.

The interconnections among the various components 120, 122, 124, 126, 128, 130 are illustrative in nature, and other appropriate interconnections are within the scope of the present invention. Further, it should be appreciated that the various elements can be implemented as separate software modules, or as part of one large code.

The user interface module 126 can provide control to extract the first biometric parameter from the database 128. Such control can be provided directly to database 128, through biometric parameter module 120, or in any other desired fashion.

In view of the foregoing, it will be appreciated that the present invention contemplates a program storage device readable by machine, tangibly embodying a program of instructions executable by the machine to perform method steps for speaker normalization in accordance with the present invention. The program storage device may include a program of instructions to carry out any or all of the method steps set forth herein, or any appropriate subset thereof While there have been described what are presently believed to be the preferred embodiments of the invention, those skilled in the art will realize that various changes and modifications can be made to the invention without departing from the spirit of the invention, and it is intended to claim all such changes and modifications as fall within the scope of the invention.

What is claimed is:

1. A method of speaker normalization comprising the steps of:
   (a) receiving a first biometric parameter, $\gamma_i$, correlated to vocal tract length of an $i^{th}$ user of a speech recognition system;
   (b) calculating a first frequency scaling factor, $k_i$, based on said first biometric parameter; and
   (c) extracting acoustic features from speech of said $i^{th}$ user in accordance with said first frequency scaling factor.

2. The method of claim 1, wherein said first biometric parameter is one of:
   height,
   a spatial dimension of a preselected bodily member, and
   size of an article of clothing which correlates with said spatial dimension.

3. The method of claim 2, wherein said first biometric parameter is height.

4. The method of claim 1, further comprising the additional step of:
   prior to step (a), querying said user for a value indicative of said first biometric parameter;
   wherein:
   step (a) comprises receiving said first biometric parameter from said user in response to said querying.

5. The method of claim 1, wherein step (a) comprises sensing said first biometric parameter by automated observation of said user.

6. The method of claim 1, further comprising the additional step of:
   prior to step (a), performing identification on said user to determine identity of said user;
   wherein:
   step (a) comprises extracting said first biometric parameter from a database of users based on said identity of said user.

7. The method of claim 6, wherein said performing identification comprises performing speaker identification.

8. The method of claim 1, wherein step (c) comprises frequency axis frequency scaling in accordance with said first frequency scaling factor.

9. The method of claim 8, wherein said frequency scaling comprises linear frequency scaling in accordance with:

$$f^* = k_i f;$$

wherein:
f* is a scaled frequency and f is an original frequency.

10. The method of claim 9, wherein said first frequency scaling factor is determined in accordance with:

$$k_i = \gamma_i / \gamma_{av};$$

wherein:
$\gamma_{av}$ is an average value of said first biometric parameter for a representative population of users.

11. The method of claim 10, wherein:
said first biometric parameter $\gamma_i$ is height, $h_i$, of said user;
said first frequency scaling factor is determined in accordance with:

$$k_i = h_i / h_{av}, \text{ and}$$

$h_{av}$ is an average height for said representative population of said users.

12. The method of claim 8, wherein said frequency scaling is achieved by digital signal processing of a signal representative of said speech of said user.

13. The method of claim 8, wherein:
said user is a training speaker; and
step (c) includes the sub-step of formatting said acoustic features for subsequent acoustic model building.

14. The method of claim 8, wherein:
said user is a testing speaker; and
step (c) includes the sub-step of formatting said acoustic features for subsequent speech recognition.

15. The method of claim 1, wherein step (c) comprises the sub-steps of:

(c-1) transforming a signal representative of said speech of said user from a time domain to a frequency domain, to obtain a resulting frequency spectrum having a frequency axis;

(c-2) calculating a log-magnitude of said resultant frequency spectrum;

(c-3) scaling said frequency axis according to said first frequency scaling factor $k_i$;

(c-4) partitioning said frequency axis into bins;

(c-5) summing spectral components falling into each of said bins to obtain a binned spectrum; and (c-6) inverse-transforming said binned spectrum to obtain time-domain acoustic features for each of a series of time windows.

16. The method of claim 15, wherein sub-step (c-3) comprises linear scaling in accordance with:

$$f^* = K_i f;$$

wherein:

$f^*$ is a scaled frequency and f is an original frequency.

17. The method of claim 1, further comprising the additional steps of:

(d) receiving a second biometric parameter, $\xi_j$, correlated to vocal tract length of a $j^{th}$ user of said speech recognition system;

(e) calculating a second frequency scaling factor, $k_j$, based on said second biometric parameter; and (f) extracting acoustic features from speech of said $j^{th}$ user in accordance with said second frequency scaling factor.

18. The method of claim 17, further comprising the additional steps of:

prior to step (a), querying said $i^{th}$ user regarding which of N biometric parameters said $i^{th}$ user wishes to employ as said first biometric parameter; and prior to step (d), querying said $j^{th}$ user regarding which of said N biometric parameters said $j^{th}$ user wishes to employ as said second biometric parameter;

wherein N is at least 2.

19. The method of claim 18, wherein said first and second biometric parameters are the same biometric parameter.

20. The method of claim 18, wherein said first and second biometric parameters are different biometric parameters.

21. An apparatus for speaker normalization, said apparatus comprising:

(a) a biometric parameter module which receives a first biometric parameter, $\gamma_i$, correlated to vocal tract length of an $i^{th}$ user of a speech recognition system;

(b) a calculation module which calculates a first frequency scaling factor, $K_i$, based on said first biometric parameter; and (c) an acoustic feature extractor which extracts acoustic features from speech of said $i^{th}$ user in accordance with said first frequency scaling factor.

22. The apparatus of claim 21, wherein said first biometric parameter is one of:

height, a spatial dimension of a preselected bodily member, and size of an article of clothing which correlates with said spatial dimension.

23. The apparatus of claim 22, wherein said first biometric parameter is height.

24. The apparatus of claim 21, further comprising:

a user interface module which queries said user for a value indicative of said first biometric parameter;

wherein:

said biometric parameter module receives said first biometric parameter from said user, via said user interface module, in response to said querying.

25. The apparatus of claim 21, wherein said user interface module senses said first biometric parameter by automated observation of said user.

26. The apparatus of claim 21, further comprising:

a database of users which contains biometric parameters of given users stored with identities of said given users;

wherein:

said user interface module is configured to perform identification on said user to determine identity of said user; and said user interface module provides control to extract said first biometric parameter from said database of users based on said identity of said user.

27. The apparatus of claim 26, further comprising a speaker identification module coupled to said user interface module, wherein said user interface module communicates with said speaker identification module to perform said identification of said user via speaker identification.

28. The apparatus of claim 21, wherein said acoustic feature extractor performs frequency axis frequency scaling in accordance with said first frequency scaling factor.

29. The apparatus of claim 28, wherein said frequency scaling comprises linear frequency scaling in accordance with:

$$f^* = K_i f;$$

wherein:

$f^*$ is a scaled frequency and f is an original frequency.

30. The apparatus of claim 29, wherein said first frequency scaling factor is determined in accordance with:

$$k_i = \gamma_i / \gamma_{av};$$

wherein:

$\gamma_{av}$ is an average value of said first biometric parameter for a representative population of users.

31. The apparatus of claim 30, wherein:

said first biometric parameter $\gamma_i$ is height, $h_i$, of said user;

said first frequency scaling factor is determined in accordance with:

$$k_i = h_i / h_{av}, \text{ and}$$

$h_{av}$ is an average height for said representative population of said users.

32. The apparatus of claim 28, wherein said frequency scaling is achieved by digital signal processing of a signal representative of said speech of said user.

33. The apparatus of claim 28, wherein:

said user is a training speaker; and said acoustic feature extractor formats said acoustic features for subsequent acoustic model building.

34. The apparatus of claim 28, wherein:

said user is a testing speaker; and said acoustic feature extractor formats said acoustic features for subsequent speech recognition.

35. The apparatus of claim 21, wherein said acoustic feature extractor is configured to:

transform a signal representative of said speech of said user from a time domain to a frequency domain, to obtain a resulting frequency spectrum having a frequency axis;

calculate a log-magnitude of said resultant frequency spectrum;

scale said frequency axis according to said first frequency scaling factor $K_i$;

partition said frequency axis into bins;

sum spectral components falling into each of said bins to obtain a binned spectrum; and inverse-transform said binned spectrum to obtain time-domain acoustic features for each of a series of time windows.

36. The apparatus of claim 35, wherein said frequency axis is scaled via linear scaling in accordance with:

$$f^* = K_i f;$$

wherein:

f* is a scaled frequency and f is an original frequency.

37. The apparatus of claim 21, wherein:

said biometric parameter module is configured to receive a second biometric parameter, $\xi_j$, correlated to vocal tract length of a $j^{th}$ user of said speech recognition system;

said calculation module is configured to calculate a second frequency scaling factor, $k_j$, based on said second biometric parameter; and said acoustic feature extractor is configured to extract acoustic features from speech of said $j^{th}$ user in accordance with said second frequency scaling factor.

38. The apparatus of claim 37, wherein said user interface module is configured to:

query said $i^{th}$ user regarding which of N biometric parameters said $i^{th}$ user wishes to employ as said first biometric parameter; and query said $j^{th}$ user regarding which of said N biometric parameters said $j^{th}$ user wishes to employ as said second biometric parameter;

wherein N is at least 2.

39. The apparatus of claim 38, wherein said first and second biometric parameters are the same biometric parameter.

40. The apparatus of claim 38, wherein said first and second biometric parameters are different biometric parameters.

41. A program storage device readable by machine, tangibly embodying a program of instructions executable by the machine to perform method steps for speaker normalization, said method steps comprising:

(a) receiving a first biometric parameter, $\gamma_i$, correlated to vocal tract length of an $i^{th}$ user of a speech recognition system;

(b) calculating a first frequency scaling factor, $K_i$, based on said first biometric parameter; and (c) extracting acoustic features from speech of said $i^{th}$ user in accordance with said first frequency scaling factor.

\* \* \* \* \*